US010569916B2

(12) United States Patent
Sander et al.

(10) Patent No.: US 10,569,916 B2
(45) Date of Patent: Feb. 25, 2020

(54) APPARATUS FOR THE TRANSFER OF FOIL BAGS

(71) Applicant: INDAG Pouch Partners GmbH, Eppelheim (DE)

(72) Inventors: Jörg Sander, Heidelberg (DE); Gernot Kerner, Neckargemünd (DE); Josef Weis, Nußloch (DE)

(73) Assignee: INDAG POUCH PARTNERS GMBH, Eppelheim (DE)

( * ) Notice: Subject to any disclaimer, the term of this patent is extended or adjusted under 35 U.S.C. 154(b) by 291 days.

(21) Appl. No.: 15/583,340

(22) Filed: May 1, 2017

(65) Prior Publication Data
US 2017/0313456 A1 Nov. 2, 2017

(30) Foreign Application Priority Data

May 2, 2016 (EP) .................................. 16167896.6

(51) Int. Cl.
*B65B 43/28* (2006.01)
*B65B 43/46* (2006.01)
(Continued)

(52) U.S. Cl.
CPC .............. *B65B 43/28* (2013.01); *B65B 43/16* (2013.01); *B65B 43/44* (2013.01); *B65B 43/46* (2013.01);
(Continued)

(58) Field of Classification Search
CPC ........ B65G 37/00; B65G 21/10; B65B 43/44; B65B 43/46; B65B 43/465; B65B 43/58;
(Continued)

(56) References Cited

U.S. PATENT DOCUMENTS 2,654,518 A * 10/1953 Kindseth ................... B65B 1/22
141/281
2,721,015 A * 10/1955 Canales .................. B65B 5/045
193/25 A
4,330,288 A * 5/1982 Russell .................... B65B 43/34
198/377.07
4,456,118 A * 6/1984 Kauffman ............... B65B 3/025
198/462.1
(Continued)

FOREIGN PATENT DOCUMENTS

EP    2113462 A1    4/2009
WO   2005100163 A1  10/2005

OTHER PUBLICATIONS

EP16167896; European Search Report; dated Nov. 8, 2016, pp. 1-7.

*Primary Examiner* — James R Bidwell
(74) *Attorney, Agent, or Firm* — Mayer Brown LLP

(57) ABSTRACT

The present invention refers to an apparatus for the transfer of foil bags, the apparatus comprising a magazine system, a plurality of adjacently arranged bag receptacles for the simultaneous transportation of adjacently arranged foil bags, and comprising a plurality of clamps which are each configured for gripping a foil bag in a bag receptacle and for the suspended transportation of the foil bag, wherein the apparatus is configured such that during operation foil bags are transferred from the foil bag magazines to the bag receptacles and are gripped in the bag receptacles by the clamps and are transported in suspended fashion, and wherein the apparatus comprises height-adjustable bottom support elements which are configured and arranged such that they respectively support from below the bottom of a foil bag in a bag receptacle up to the position where the clamps grip the foil bag.

15 Claims, 7 Drawing Sheets

(51) Int. Cl.
*B65B 59/00* (2006.01)
*B65B 43/16* (2006.01)
*B65B 43/44* (2006.01)
*B65G 37/00* (2006.01)

(52) U.S. Cl.
CPC ............ *B65B 43/465* (2013.01); *B65B 59/00* (2013.01); *B65G 37/00* (2013.01)

(58) Field of Classification Search
CPC   B65B 43/59; B65B 59/00; B65B 3/04; B65B 43/28; B65B 43/16
USPC   .......... 198/470.1, 471.1, 476.1; 53/410, 468, 53/469, 284.7, 133.2
See application file for complete search history.

(56) References Cited

U.S. PATENT DOCUMENTS

| | | | | |
|---|---|---|---|---|
| 5,058,364 | A * | 10/1991 | Seiden | B65B 43/04 53/385.1 |
| 5,443,150 | A * | 8/1995 | Buchko | B26D 1/045 198/463.3 |
| 6,073,424 | A * | 6/2000 | Kraft | B65B 43/465 53/570 |
| 7,992,702 | B2 * | 8/2011 | Furlotti | B65G 47/847 198/377.01 |
| 2003/0233812 | A1 * | 12/2003 | Rogers | B65B 3/32 53/410 |
| 2008/0156617 | A1 * | 7/2008 | Wild | B65G 17/323 198/347.1 |
| 2009/0272074 | A1 * | 11/2009 | Kurz | B65B 59/005 53/284.7 |
| 2015/0284122 | A1 * | 10/2015 | Murray | B65B 43/04 248/99 |

\* cited by examiner

APPARATUS FOR THE TRANSFER OF FOIL BAGS

RELATED APPLICATIONS

This application claims the benefit of, and priority to, European Patent Application No. 16167896.6, filed May 2, 2016, which is incorporated by reference herein in its entirety.

BACKGROUND

So far receptacle cases have been used for the transfer of the foil bags, each having a fixedly assigned bottom. The bottom supports the bottom of the foil bag during transportation. This system, however, has various drawbacks. On the one hand, the receptacle cases have a large mass, which on the whole has a negative impact on energy consumption. On the other hand, these receptacle cases with bottom are each only suited for foil bags of a longitudinal extension (or height). The foil bags, however, are gripped at a fixed height by the clamps. Bags which are shorter must therefore be transported in a receptacle case with a higher bottom which moves them to the suitable height. This means that a format change is required, that the receptacle case is exchanged or each bottom is adjusted individually. Improved apparatuses for the transfer of the foil bags are needed in the art.

SUMMARY

The present invention provides, in various embodiments, an apparatus for the transfer of foil bags, comprising a magazine system with a plurality of adjacently arranged foil bag magazines, a plurality of adjacently arranged bag receptacles for the simultaneous transportation of adjacently arranged foil bags, wherein each bag receptacle is configured to laterally support and hold one of the foil bags and comprises clamps which are each configured for gripping a foil bag in a bag receptacle and for the suspended transportation of the foil bag, wherein the apparatus is configured such that during operation foil bags are transferred from the foil bag magazines to the bag receptacles and are gripped in the bag receptacles by the clamps and are transported in suspended fashion.

In some embodiments, the invention provides an apparatus for the transfer of foil bags, comprising a magazine system with a plurality of adjacently arranged foil bag magazines, a plurality of adjacently arranged bag receptacles for the simultaneous transportation of adjacently arranged foil bags, wherein each bag receptacle is configured to laterally support and hold one of the foil bags and comprises clamps each configured for gripping a foil bag in the bag receptacle and for the suspended transportation of the foil bag, wherein the apparatus is configured such that during operation foil bags are transferred from the foil bag magazines to the bag receptacles and are gripped in the bag receptacles by the clamps and are transported in suspended fashion, characterized by height-adjustable bottom support elements configured and arranged such that they respectively support from below the bottom of a foil bag in a bag receptacle up to the position where the clamps grip the foil bag.

In some embodiments, the bag receptacle is open downwards and upwards.

In some embodiments, the bottom support elements are configured in the apparatus in the form of support hooks.

In some embodiments, during operation the apparatus is configured such that the bottom support elements are moved along in synchronization and in parallel with the bag receptacles up to the position where the clamps grip the foil bag.

In some embodiments, the synchronous movement takes place by way of mechanical coupling or by way of a control device and an additional drive.

In some embodiments, the apparatus is configured such that the bottom support elements are moved back into an initial position after the foil bag supported by them has been gripped by the clamps.

In some embodiments, the bottom support elements are arranged to circulate.

In some embodiments, the bottom support elements are arranged in the apparatus to be movable along a height-adjustable arm.

In some embodiments, the apparatus is configured such that the bottom support elements are arranged to circulate around the height-adjustable arm.

In some embodiments, the apparatus is configured such that a height adjustment of all bottom support elements takes place in synchronization, particularly by way of mechanical coupling.

In some embodiments, the bottom support elements are arranged such that the bottom support elements are also height-adjustable by way of a height adjustment of the arm.

In some embodiments, the apparatus is adapted to different bag lengths by way of a height adjustment of the arm.

In some embodiments, an adjustment unit is provided for lifting and lowering the arm.

In some embodiments, the adjustment unit is additionally configured for adjusting the distance between opposing holding elements of the bag receptacles.

In some embodiments, an additional drive drives the bottom support elements during operation such that they circulate around the height-adjustable arm.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of the preferred embodiments of the application, will be better understood when read in conjunction with the appended drawings. For the purposes of illustrating the systems and methods of the present application, there are shown in the drawings preferred embodiments. It should be understood, however, that the application is not limited to the precise arrangements and instrumentalities shown. In the drawings.

DETAILED DESCRIPTION

Figure 1:
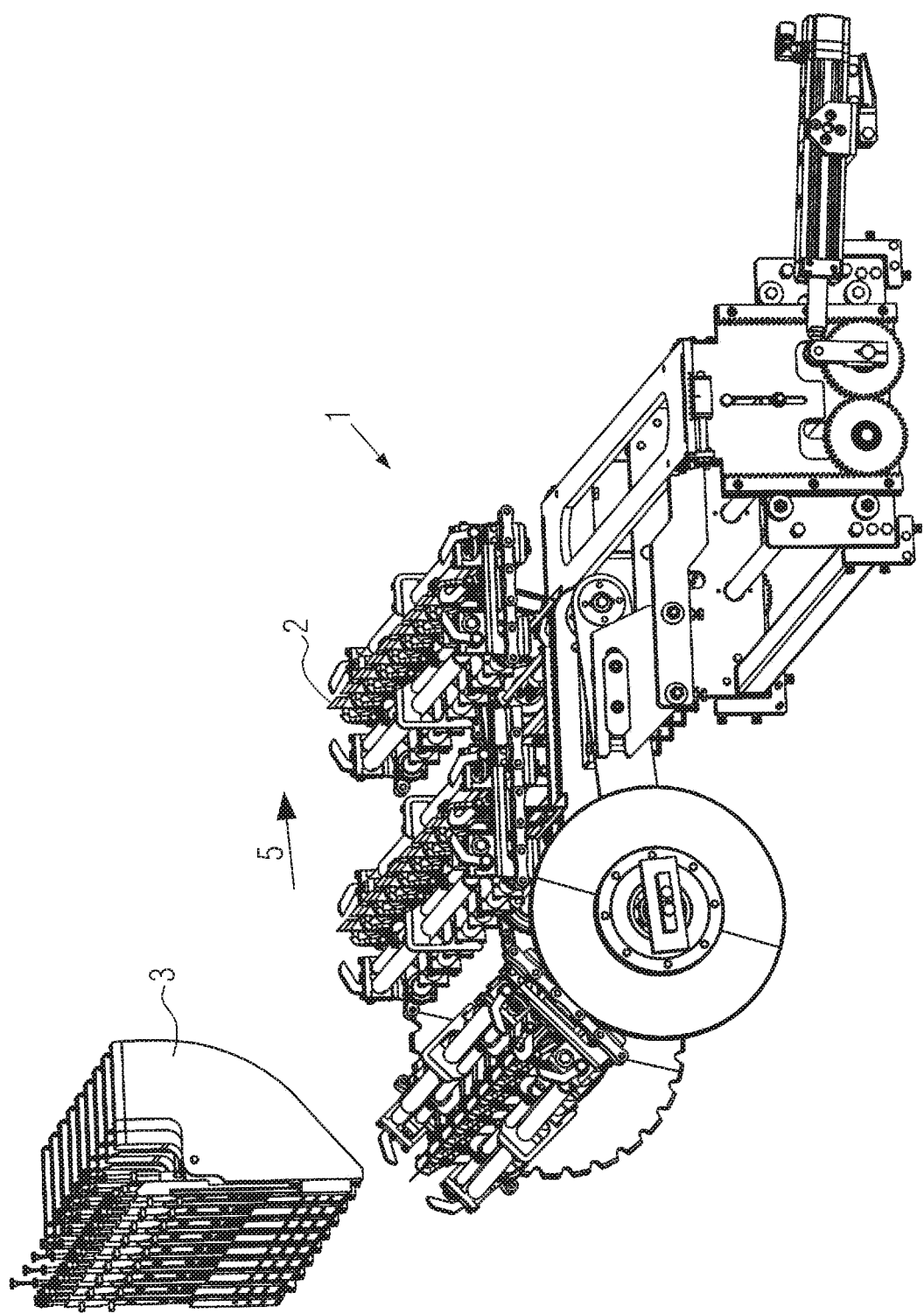
FIG. 1 is a schematic oblique view, which is not true to scale, onto the apparatus according to a preferred embodiment.

So far receptacle cases have been used for the transfer of the foil bags, each having a fixedly assigned bottom. The bottom supports the bottom of the foil bag during transportation. This system, however, has various drawbacks. On the one hand, the receptacle cases have a large mass, which on the whole has a negative impact on energy consumption. On the other hand, these receptacle cases with bottom are each only suited for foil bags of a longitudinal extension (or height). The foil bags, however, are gripped at a fixed height by the clamps. Bags which are shorter must therefore be transported in a receptacle case with a higher bottom which moves them to the suitable height. This means that a format change is required, that the receptacle case is exchanged or each bottom is adjusted individually.

It is an object of the present invention to eliminate the above-mentioned drawbacks, particularly to provide an apparatus in which energy consumption is lowered and format change simplified.

This object is achieved in that the apparatus of the present invention comprises height-adjustable bottom support elements which are configured and arranged such that they respectively support from below the bottom of a foil bag in a bag receptacle up to the position where the clamps grip the foil bag.

With the apparatus according to the invention bag receptacles can thus be used without bottom because a bottom is no longer required when the clamps grip the foil bag. This reduces energy consumption because the bag receptacles have a lower mass. Moreover, the bag receptacle itself can remain unchanged when a format change takes place because it is enough to adjust the bottom support elements independently of the bag receptacles. Hence, a format change is simplified.

Foil bags are configured, e.g. welded together from several foils, such that they enclose a cavity which is open at one side. The open side is used for filling the foil bags, for instance with a liquid product. This side will be called upper end of the foil bag in the following. The clamps grip the foil bags laterally at their upper ends. The side of the foil bag that is opposite to the open side is called bottom. In many cases the foil bags are flat when handed over to the bag receptacle. In the bag receptacles the larger ones of the side surfaces of the foil bags are then oriented into or against the transport direction and the narrow sides of the foil bags are laterally supported by the bag receptacle.

A bag receptacle comprises at least two opposing holding elements between which the foil bag is inserted. A holding element may for instance comprise a side support element which is configured such that it laterally supports the sides of the foil bags. In addition, each holding element may comprise one of the clamps.

The side support elements may each have a receptacle for receiving a respective side of a foil bag, wherein the holding elements are arranged during operation such that the receptacles of the opposing side support elements laterally support a bag. These receptacles can particularly be configured for receiving the above-described narrow sides of the flat foil bags.

The holding elements are displaceable relative to one another in a direction transverse to the transportation direction. Thus, they can be adapted to the width of the respective bag format. Moreover, the opening of the foil bag can be enlarged by moving the holding elements towards one another.

Details on the holding elements, particularly the side walls, the clamps and the width adjustment can be inferred from EP 2 113 462 A1.

The bag receptacle can be open downwards and upwards. This means that the bag receptacle has only lateral boundaries and only holding elements, respectively. The bottom support elements can thereby support the laterally supported foil bags from below in that they are arranged at a lower level than the holding elements and directly underneath the foil bags or in that they are directly arranged underneath the foil bags and project from below into the bag receptacle. This means that the bottom support elements can be arranged between the holding elements as long as they support the foil bag.

The receptacles are particularly configured such that a height adjustment of the foil bags is not limited by the receptacles. Hence, the receptacles allow a free movement of the foil bags upwards or downwards.

The bottom support elements may each comprise one or plural rods, wherein a part of the rod or of the rods supports the foil bag from below. The bottom support elements can particularly be configured in the form of support hooks. The support hooks may e.g. consist of a rod which has a bend, particularly a bend of 80° to 100°, particularly of 85° to 95°, particularly 90°. Alternatively, the support hooks may consist of two rods that are attached, e.g. welded, to each other at an angle of 80° to 100°, particularly of 85° to 95°, particularly 90°. Such support hooks may be arranged during operation such that the end of a support hook which supports the foil bag is oriented into transportation direction, particularly is arranged in parallel with the transportation direction. Alternatively, the bottom support elements may be designed in the form of support forks or support arches.

The bottom support elements can be coupled to one another mechanically. The mechanical coupling may be configured such that the relative position of the bottom support elements is fixed or that the relative position of the bottom support elements is adjustable, wherein during operation the bottom support elements are locked in their position. The relative position of the bottom support elements may alternatively also be controllable by a control device.

The apparatus may be configured such that during operation the bottom support elements are moved along in synchronism and in parallel with the bag receptacles up to the position where the clamps grip the foil bag. The bottom support elements are thus carried along with the foil bags. They hold the foil bags in a position, particularly at the correct height, in the bag receptacles in which the clamps can grip the foil bags. The carrying along or the synchronous movement can take place by way of mechanical coupling or by way of an additional drive and optionally a corresponding control device.

Furthermore, the apparatus may be configured such that the bottom support elements are moved back into an initial position after the foil bags have been gripped by the clamps. Particularly, the bottom support elements are moved back into the initial position immediately after the foil bags have been gripped by the clamps, specifically while the foil bags still remain in the respective bag receptacle. The initial position is here the position where the bottom support element starts to support a foil bag from below when it is transferred from a foil bag magazine to a bag receptacle. Thus each bottom support element can be used for supporting subsequent foil bags as soon as the supporting function is no longer needed. Particularly, the bottom support elements can be arranged to circulate in the apparatus.

The bottom support elements can be movably arranged along a height-adjustable arm, particularly pivot arm, particularly to circulate around the arm. During operation the arm may be fixedly arranged at one end and may be height-adjustable at one end. The arm is thus pivotable. Such an arm is called pivot arm. Alternatively, both ends of the arm may be height-adjustable, for instance by way of a lifting mechanism.

The apparatus may be configured such that a height adjustment of all bottom support elements takes place in synchronism, particularly by way of mechanical coupling. Particularly, the bottom support elements may be arranged such that upon height adjustment of the arm the bottom support elements are also height-adjusted, particularly without intervention by machine or by hand. The apparatus may also be configured such that by height adjustment of the arm the apparatus can be adapted to different bag lengths.

For lifting and lowering the arm an adjustment unit may be provided. Thus the apparatus may comprise an adjustment unit for the height adjustment of the arm. The adjustment unit can be particularly configured in the form of an adjustment unit for the mechanical height adjustment of the arm. The adjustment unit can additionally be configured for the distance adjustment of opposite holding elements of the bag receptacles.

The apparatus may comprise a control unit which is configured for the control of one or a plurality of the following steps: the distance adjustment of the holding elements of the bag receptacles, the height adjustment of the bottom support elements or of the arm, respectively, and/or the synchronous movement of the bottom support elements.

Further features and advantages will be explained hereinafter with reference to the exemplary figures.

Figure 2:
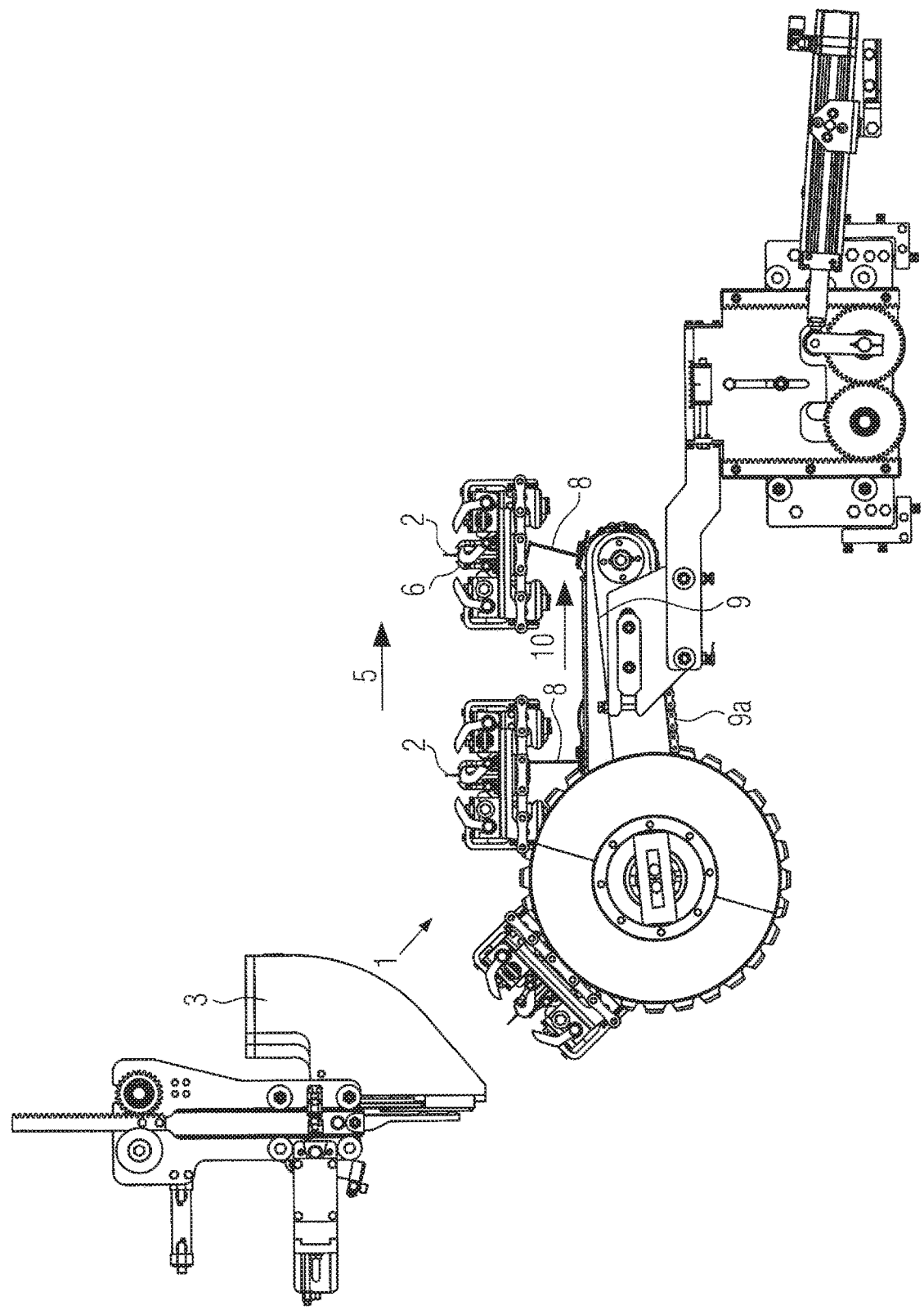
FIG. 2 is a schematic side view, which is not true to scale, onto the apparatus of the preferred embodiment.

FIG. 1 is an oblique view onto a preferred embodiment of an apparatus 1 for the transfer of foil bags 2, and FIG. 2 is a side view of this embodiment. The foil bags are foil bags that are rectangular in a flat state and are open at one side (the upper side) and are closed on all of the other sides. The side of the foil bag that is opposite to the upper side is called bottom. The open upper side is oriented upwards during transportation, and the bottom downwards. It should here be noted that the foil bag may be folded in the bottom area such that a standing bottom is obtained upon unfolding of the foil bag.

FIG. 1 shows a magazine system with adjacently arranged foil bag magazines in the form of magazine shafts 3. During operation foil bags are stacked from above into the magazine shafts and removed at the bottom. The step in which the foil bags are transferred from the foil bag magazines to the bag receptacles comprises the simultaneous transfer of a respective foil bag to a respective bag receptacle from all magazine shafts. The transfer is carried out by machine, for instance by way of a suction mechanism (not shown here). The simultaneously equipped bag receptacles form a row of adjacently arranged bag receptacles. The equipped bag receptacles are moved side by side in synchronism in transportation direction 5. This means that the row of bag receptacles is arranged in a direction perpendicular to the transport direction. The bag receptacles can thus transport adjacently arranged foil bags at the same time.

The bag receptacles comprise holding elements 6. Each holding element comprises a clamp 6a and a side support element 6b with a receptacle. The receptacle may for instance be, as is here the case, a slit-shaped guide which is open upwards, downwards and towards the foil bags. As is shown here, the guide may comprise slanted walls or, alternatively, walls positioned in parallel. During operation the foil bags are introduced from above into the guides and are then laterally supported therein. The receptacles are configured such that the foil bags are not gripped. A lateral movement of the foil bags and, in this example, also a movement into or against the transportation direction is limited by the receptacles. The receptacles are configured such that a height adjustment of the foil bags, i.e. an upward or downward movement, is possible. This is made possible in that the receptacles do not pinch the foil bags, so that the bags can be inserted without any problems. In this example this is accomplished in that the guides are open at the bottom and at the top. The clamps are arranged and configured such that they grip the foil bags laterally at their upper ends. A foil bag is here preferably gripped by a clamp at each side.

The distances of the holding elements are adjustable and are adjusted according to the width of the respectively processed foil bags. During transfer out of the foil bag magazines the foil bags are flat and thus have their maximum width. The holding elements are arranged at this point of time at a distance that approximately corresponds to the maximum width, so that the foil bags can be inserted without any problems into the bag receptacles and can be safely supported laterally in these receptacles.

The apparatus is configured such that the distances of the holding elements from one another are adjustable by way of an adjustment device. Along the transport route of the bags into the receptacle cases the distance of the holding elements can optionally be reduced. The foil bags can thus be opened at their upper side, for instance in order to fill in a liquid. When the distance turns out to be minimally smaller than the bag width at the time of the clamp grasp, a maximum clamp engagement can be guaranteed.

The foil bags are transported in the bag receptacles and one or plural clamps 6a grip a respective foil bag at a specific position. The clamps grip the foil bag in this case laterally at the upper ends thereof. The clamps are configured such that they can transport the foil bag in suspended fashion. This means that the gripping force of the clamps is enough to reliably hold the foil bag and to prevent a falling down. The foil bags are then further transported by means of the clamps.

The figures also show height-adjustable bottom support elements 8 that are configured and arranged such that during operation they respectively support from below the bottom of a foil bag in a bag receptacle up to the position where the clamps grip the foil bag. To this end the bottom support elements are running during operation in synchronism with the bag receptacles. The synchronous movement is here achieved by way of a mechanical coupling, but can alternatively also be carried out by way of separate drives that are controlled by means of a control device.

After the gripping of the corresponding foil bags the bottom support elements are again transported by the clamps back into the initial position where the transfer of foil bags into the bag receptacles takes place. The bottom support elements are here arranged to circulate around a pivot arm 9. During operation the support hooks are running around the pivot arm in the direction marked with reference numeral 10. Here, the bottom support elements are for example driven by way of a chain 9a around the pivot arm.

The bottom support elements are here configured in the form of support hooks. These may for instance be metal rods that have a bend, in this example a bend of about 90°. Other angles are possible and the hooks can also be composed of several metal rods. As can here be seen, the hooks have a section which is arranged substantially perpendicular to the surface of the pivot arm, and a section which during support of the foil bags from below is oriented in transportation direction, in this example substantially parallel to the transportation direction. Instead of the support hooks, other bottom support elements may also be provided. If the bottom support elements are made broad, a tilting or oblique position of the containers can be avoided.

In the illustrated example the support hooks are arranged side by side in a row along a transverse rod and are made integral therewith. Alternatively, they may also be attached thereto or may be movable along said transverse rod.

When the support hooks and the transverse rod are made integral, the distance of the support hooks is fixed. When the support hooks are movable along the transverse rod, the distance can be adjusted by means of an adjustment unit, especially automatically. This can be done before the start of the operation or during operation.

The distances of the support hooks are or will be adjusted during operation such that it is ensured that at least one support hook is assigned to each foil bag. If exactly one support hook is assigned to each foil bag, it would be preferable if the support hook was arranged approximately in the center in relation to the bottom of the foil bag. In this case a row of support hooks has about the same distance as the foil bags in this row. If two support hooks are provided for one foil bag, these may each be arranged between the center of the bottom of the foil bag and an outer edge of the bottom on different sides of the center.

Optionally, the distances of the support hooks may be adjustable together with the distances of the holding elements of the bag receptacles in that the same adjustment unit is used for adjustment or in that an adjustment unit for the holding elements is coupled with an adjustment unit for the support elements. Alternatively, separate adjustment units may be provided for the holding elements and for the support hooks and the respective positions may be controlled by way of a joint control device.

Figure 3:
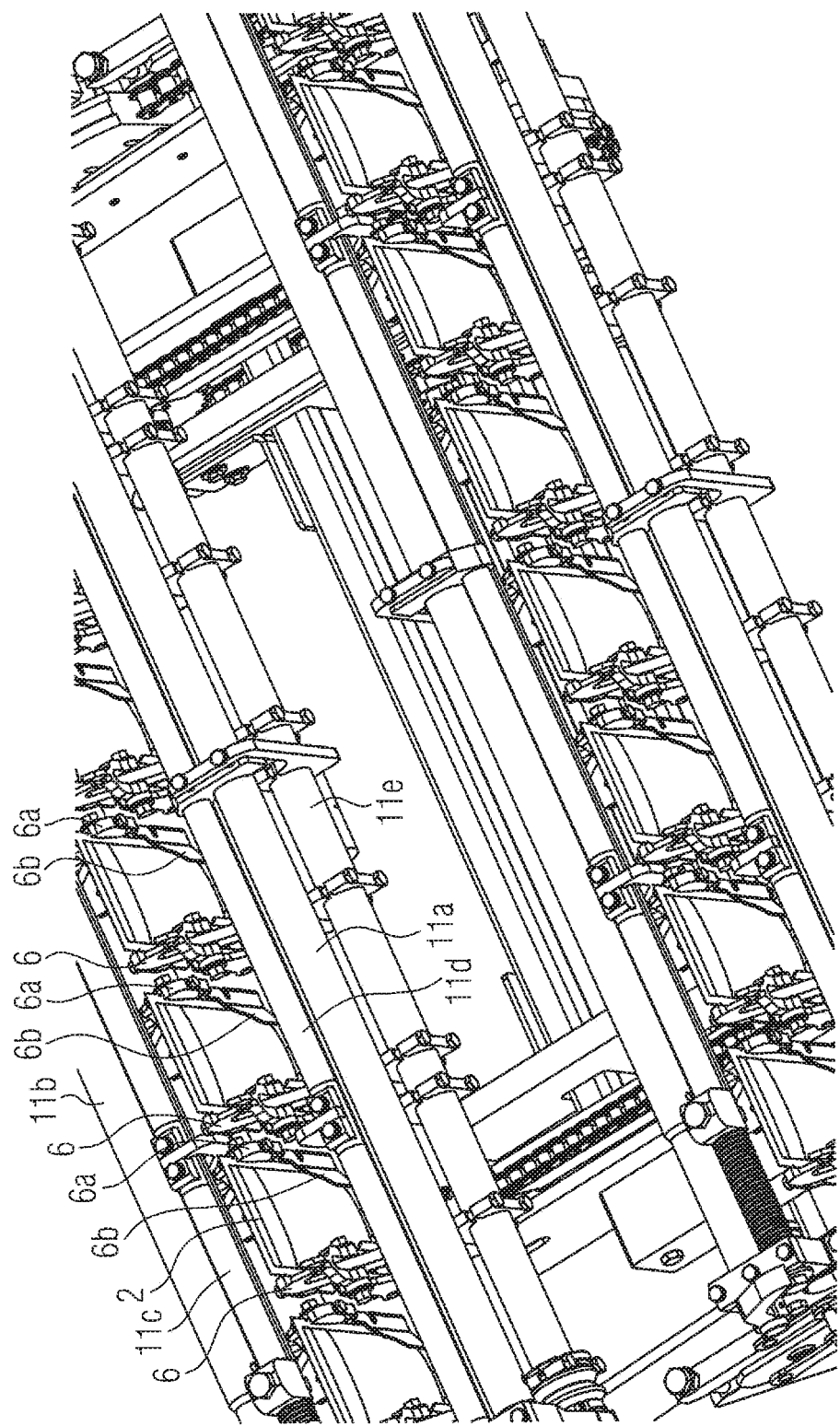
FIG. 3 is a schematic oblique view, which is not true to scale, onto two rows of bag receptacles.

FIG. 3 is an oblique view from above onto the bag receptacles with the holding elements 6. With the help of the transverse rods 11a and 11b the clamps 6b are operated. These transverse rods are arranged such that they are rotatable about their longitudinal axis, the clamps being operated by rotating said rods. The holding elements 6 are attached to displaceable pipes, the pipe 11e and a corresponding pipe (not visible in the figure). The pipe 11e is connected to the rod 11d and the corresponding invisible pipe to the rod 11c. If one of the rods 11c or 11d is displaced in a direction transverse to the transportation direction (or both relative to each other), the distances of the holding elements and thus also the width of the bag receptacles are changing. In addition, the pipe 11e and the corresponding invisible pipe respectively serve as a bearing of the rods 11a and 11d. Suitable known adjustment devices may be used as adjustment devices for adjusting the distances of the holding elements in such devices and as actuating mechanisms for the clamps. Reference should here be made by way of example to the above-mentioned publication EP 2 113 462 A1.

Figure 4:
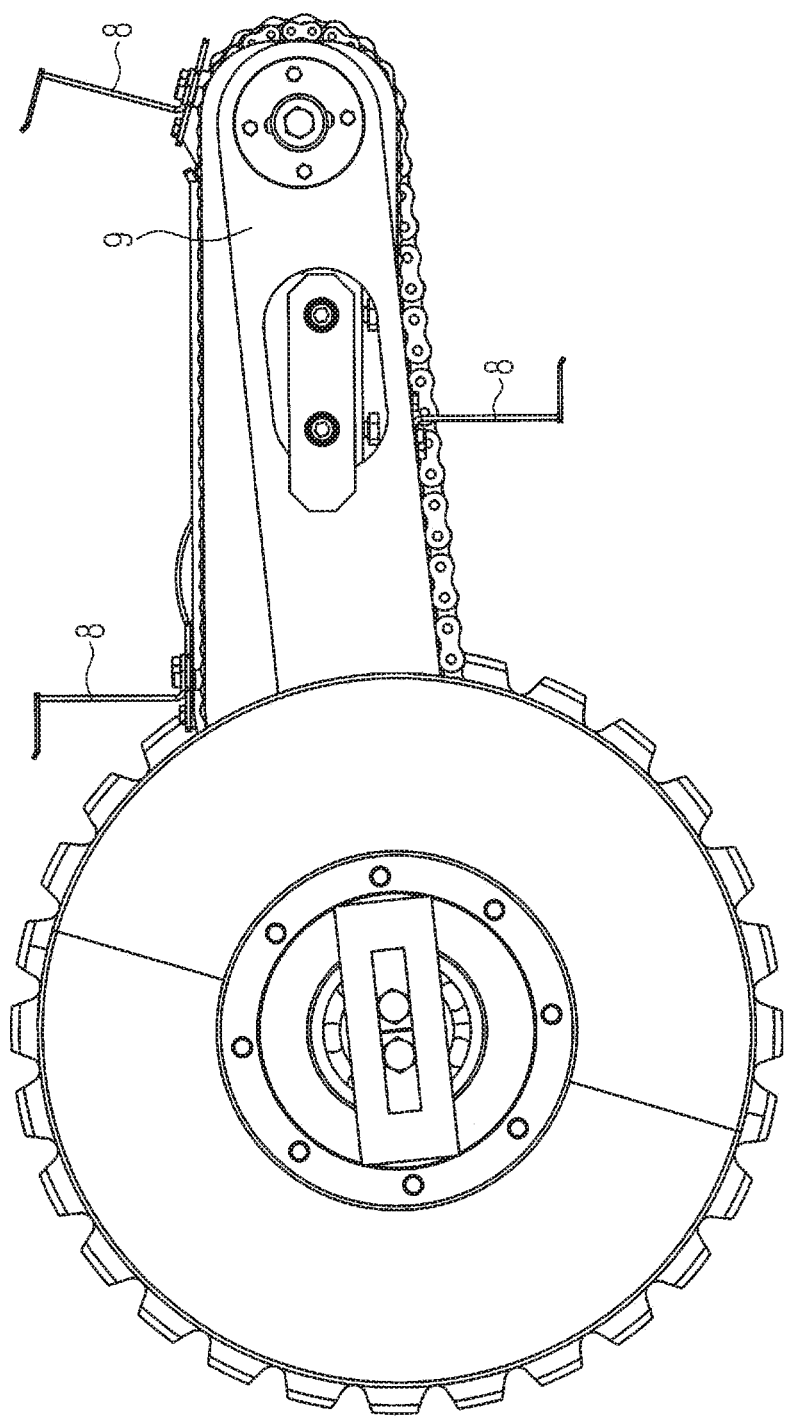
FIG. 4 is a schematic side view, which is not true to scale, of a pivot arm and circulating support hooks.
Figure 5:
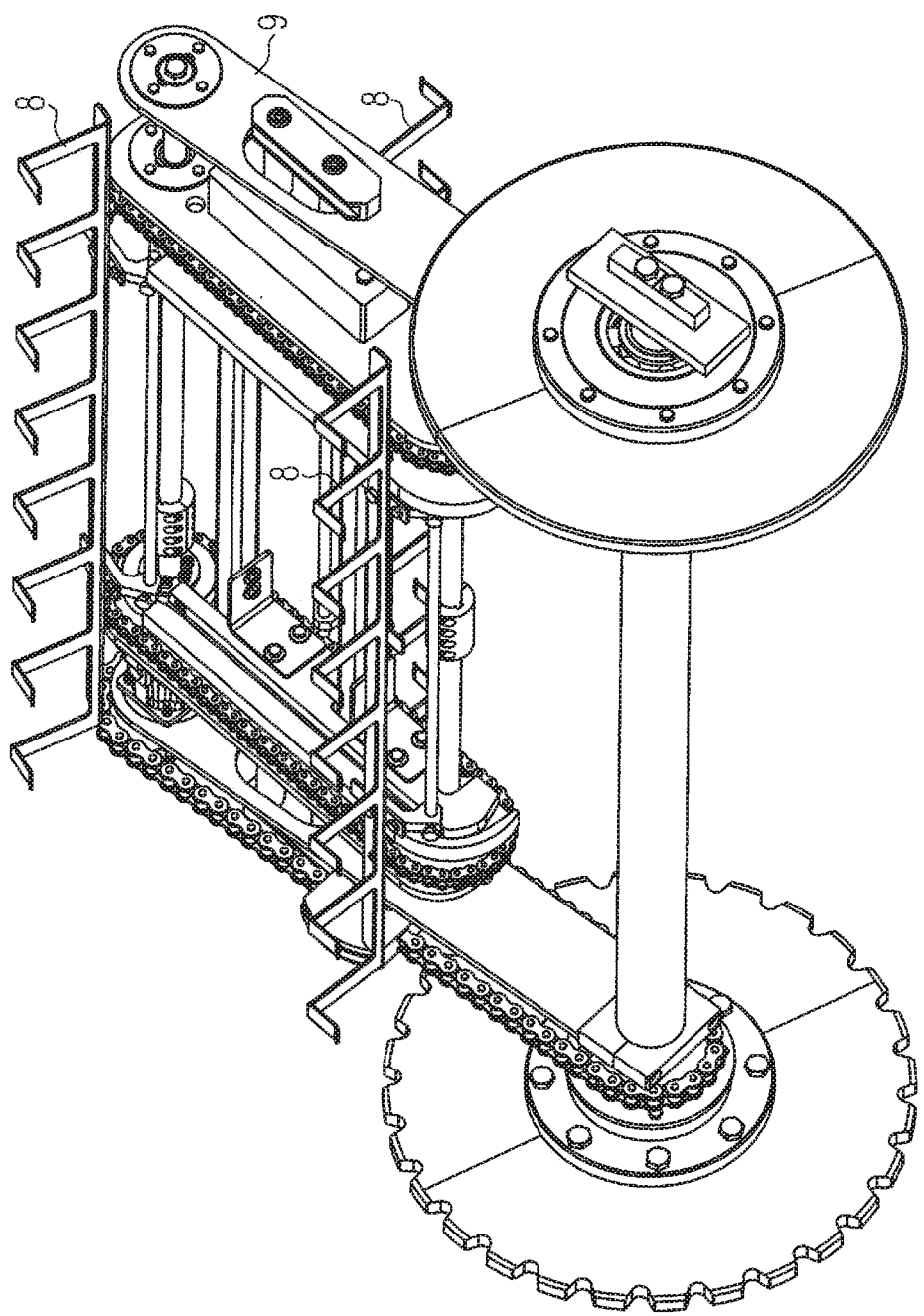
FIG. 5 is a schematic oblique view, which is not true to scale, of the pivot arm with circulating support hooks.

FIG. 4 is a side view of a pivot arm and circulating bottom support elements that can be used in the first embodiment, and FIG. 5 is an oblique view from above onto the pivot arm and the circulating bottom support elements. Here, the bottom support elements are configured in the form of support hooks, but other bottom support elements may also be used, for instance the ones shown in FIGS. 6b and 6c.

Figure 6:
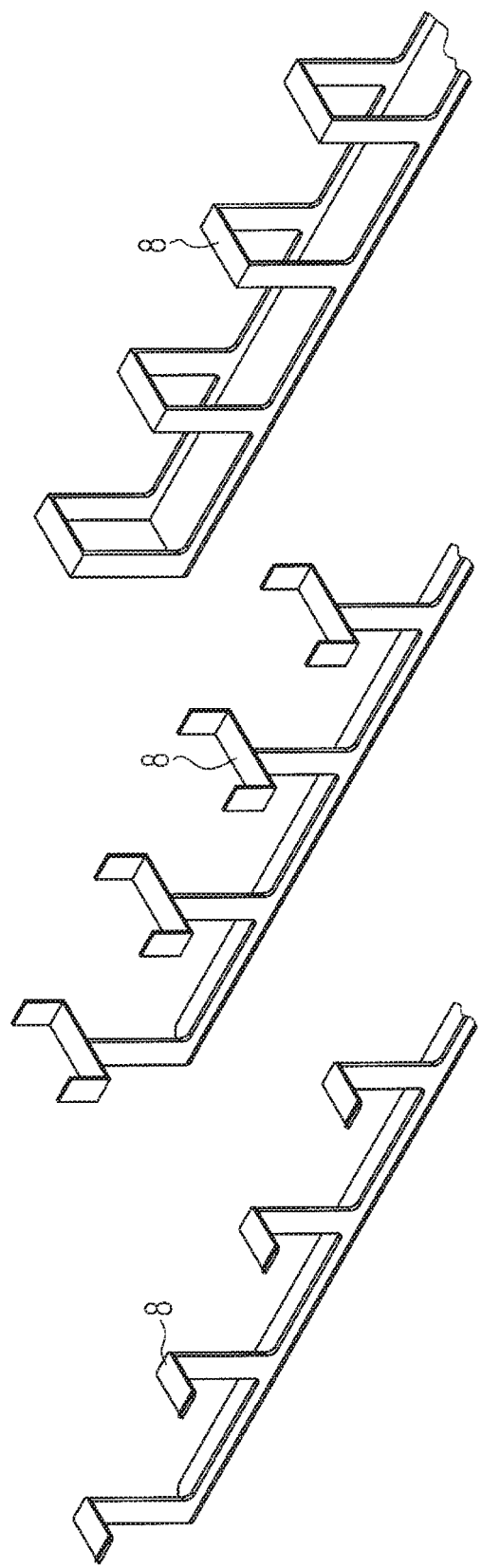
FIGS. 6a, 6b, and 6c are schematic oblique views, which are not true to scale, of different bottom support elements.

FIGS. 6a to 6c show different variants how the bottom support elements might be configured in the above-mentioned examples. FIG. 6a shows bottom support elements in the form of hooks. FIG. 6b shows bottom support elements in the form of a support fork, and FIG. 6c shows bottom support elements in the form of support arches.

Figure 7:
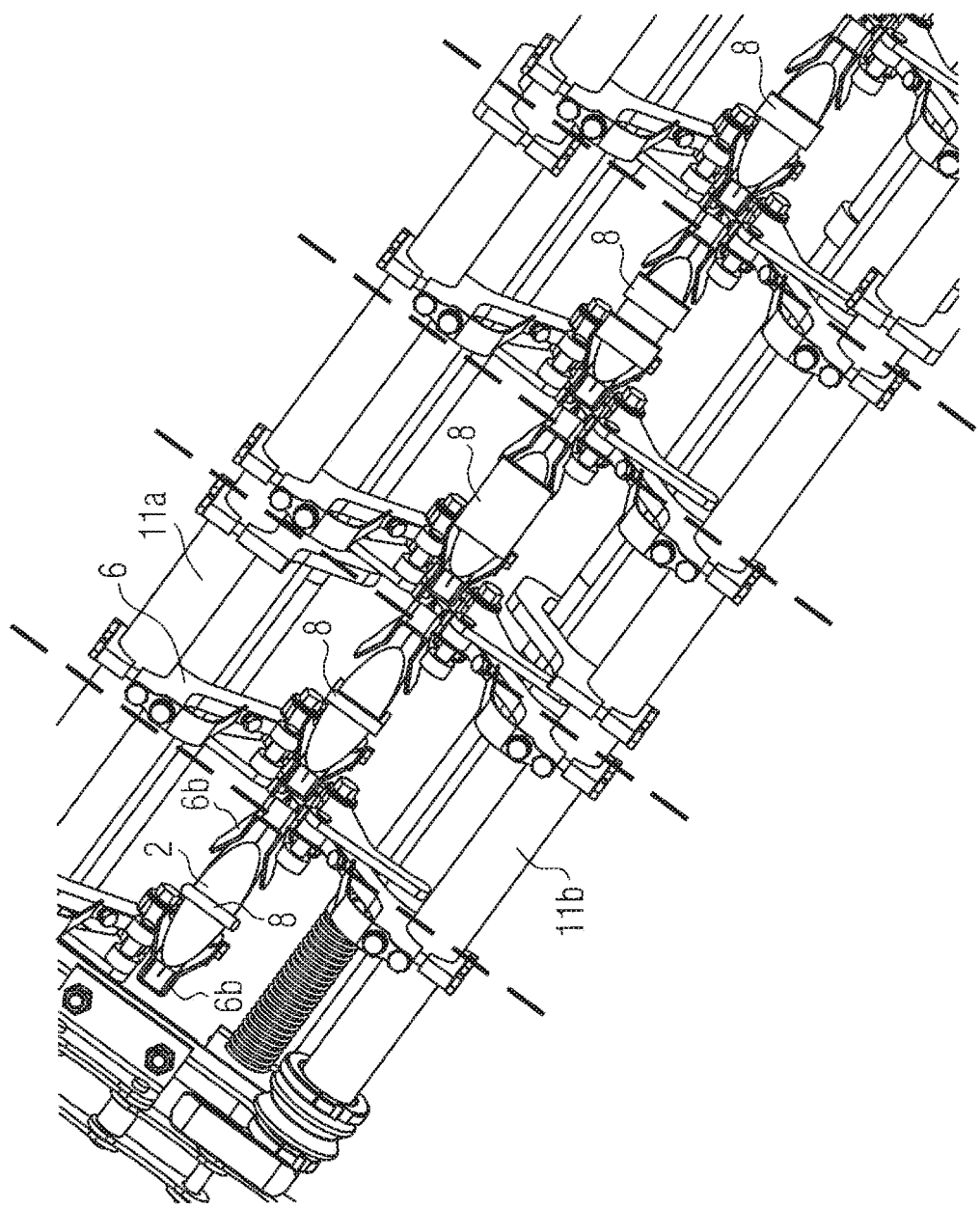
FIG. 7 is a schematic illustration, which is not true to scale, of different arrangements of the bottom support elements underneath the bottom.

Possible arrangements of the bottom support elements in a view from below are shown in detail in FIG. 7. As shown in FIG. 7, a respective support hook per foil bag may be arranged centrally underneath the foil bag. These support hooks may be so broad that they extend up to and underneath the clamps. This prevents the foil bags from tilting.

Alternatively, two support hooks per foil bag may be arranged decentralized under the foil bag or a support fork may be arranged approximately centrally underneath the foil bag. A support fork allows an improved stabilization of the foil bags. The support forks may also be made broader for further stabilization, or two decentralized support forks may be provided (not shown here). All bottom support elements may in principle also be made of round rods, which in FIG. 7 is only shown for an individual central support hook, but may also be useable for differently arranged and configured bottom support elements. It should be noted that different configurations are here shown by way of example in a figure, but that typically all bottom support elements are made identical. This is illustrated by the separation lines.

It goes without saying that features mentioned in the previously described embodiments are not restricted to these special combinations and are also possible in any other combinations.

While there have been shown and described fundamental novel features of the invention as applied to the preferred and exemplary embodiments thereof, it will be understood that omissions and substitutions and changes in the form and details of the disclosed invention may be made by those skilled in the art without departing from the spirit of the invention. Moreover, as is readily apparent, numerous modifications and changes may readily occur to those skilled in the art. For example, any feature(s) in one or more embodiments may be applicable and combined with one or more other embodiments. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

What is claimed is:

1. An apparatus for the transfer of foil bags, comprising
   a magazine system with a plurality of adjacently arranged foil bag magazines,
   a plurality of adjacently arranged bag receptacles for the simultaneous transportation of adjacently arranged foil bags, wherein each bag receptacle is configured to laterally support and hold one of the foil bags and comprises clamps each configured for gripping a foil bag in the bag receptacle and for the suspended transportation of the foil bag,
   wherein the apparatus is configured such that during operation foil bags are transferred from the foil bag magazines to the bag receptacles and are gripped in the bag receptacles by the clamps and are transported in suspended fashion, characterized by height-adjustable bottom support elements configured and arranged such that they respectively support from below the bottom of a foil bag in a bag receptacle up to the position where the clamps grip the foil bag.

2. The apparatus according to claim 1, wherein the bag receptacle is open downwards and upwards.

3. The apparatus according to claim 1, wherein the bottom support elements are configured in the apparatus in the form of support hooks.

4. The apparatus according to claim 1, wherein during operation the apparatus is configured such that the bottom support elements are moved along in synchronization and in parallel with the bag receptacles up to the position where the clamps grip the foil bag.

5. The apparatus according to claim 4, wherein the synchronous movement takes place by way of mechanical coupling or by way of a control device and an additional drive.

6. The apparatus according to claim 1, wherein the apparatus is configured such that the bottom support elements are moved back into an initial position after the foil bag supported by them has been gripped by the clamps.

7. The apparatus according to claim 1, wherein the bottom support elements are arranged to circulate.

8. The apparatus according to claim 1, wherein the bottom support elements are arranged in the apparatus to be movable along a height-adjustable arm.

9. The apparatus according to claim 8, wherein the apparatus is configured such that the bottom support elements are arranged to circulate around the height-adjustable arm.

10. The apparatus according to claim 1, wherein the apparatus is configured such that a height adjustment of all bottom support elements takes place in synchronization, particularly by way of mechanical coupling.

11. The apparatus according to claim 8, wherein the bottom support elements are arranged such that the bottom support elements are also height-adjustable by way of a height adjustment of the arm.

12. The apparatus according to claim 8, wherein the apparatus is adapted to different bag lengths by way of a height adjustment of the arm.

13. The apparatus according to claim 8, wherein an adjustment unit is provided for lifting and lowering the arm.

14. The apparatus according to claim 13, wherein the adjustment unit is additionally configured for adjusting the distance between opposing holding elements of the bag receptacles.

15. The apparatus according to claim 8, wherein an additional drive drives the bottom support elements during operation such that they circulate around the height-adjustable arm.

* * * * *